United States Patent
Reynolds et al.

[11] 3,841,693
[45] Oct. 15, 1974

[54] TILT CAB LATCH DEVICE

[75] Inventors: Roy Reynolds, Milwaukee; Raymond Clark, Pewaukee, both of Wis.

[73] Assignee: Applied Power Inc., Milwaukee, Wis.

[22] Filed: Oct. 11, 1972

[21] Appl. No.: 296,595

[52] U.S. Cl............ 296/35 R, 180/89 A, 292/111, 296/28 C
[51] Int. Cl............................................ B62d 33/06
[58] Field of Search....... 180/89 A; 296/35 R, 28 C; 292/111, 129, 201

[56] References Cited
UNITED STATES PATENTS

| | | | |
|---|---|---|---|
| 2,939,541 | 6/1960 | Smalley | 180/89 A |
| 3,497,257 | 2/1970 | Hirst | 180/89 A X |
| 3,667,566 | 6/1972 | Hopkins | 296/35 R X |
| 3,706,470 | 12/1972 | Johnson | 180/89 A X |
| 3,752,519 | 8/1973 | Nordell et al. | 292/111 |

FOREIGN PATENTS OR APPLICATIONS

| | | | |
|---|---|---|---|
| 1,205,092 | 9/1970 | Great Britain | 296/28 C |

*Primary Examiner*—David Schonberg
*Assistant Examiner*—David M. Mitchell
*Attorney, Agent, or Firm*—James E. Nilles

[57] ABSTRACT

A hydraulically actuated locking device for a tilt cab vehicle having a latch pin rigidly connected to the cab or chassis and a latch assembly mounted on the chassis or cab. The latch assembly including a hook member positioned to engage the latch pin and a cam plate pivotally connected to the hook member, the cam plate having cam surfaces for initially providing linear and subsequently angular movement of the hook member to disengage the hook member from the latch pin, the movements of the cam plate being produced by a hydraulic ram which is positioned to engage the cam plate at a point offset from its pivot axis. The latch assembly also including a spring for cushioning shock loads on the cab, the hydraulic ram can be modified to provide a fluid pressure cushion on return motion of the cab.

18 Claims, 11 Drawing Figures

PATENTED OCT 15 1974          3,841,693

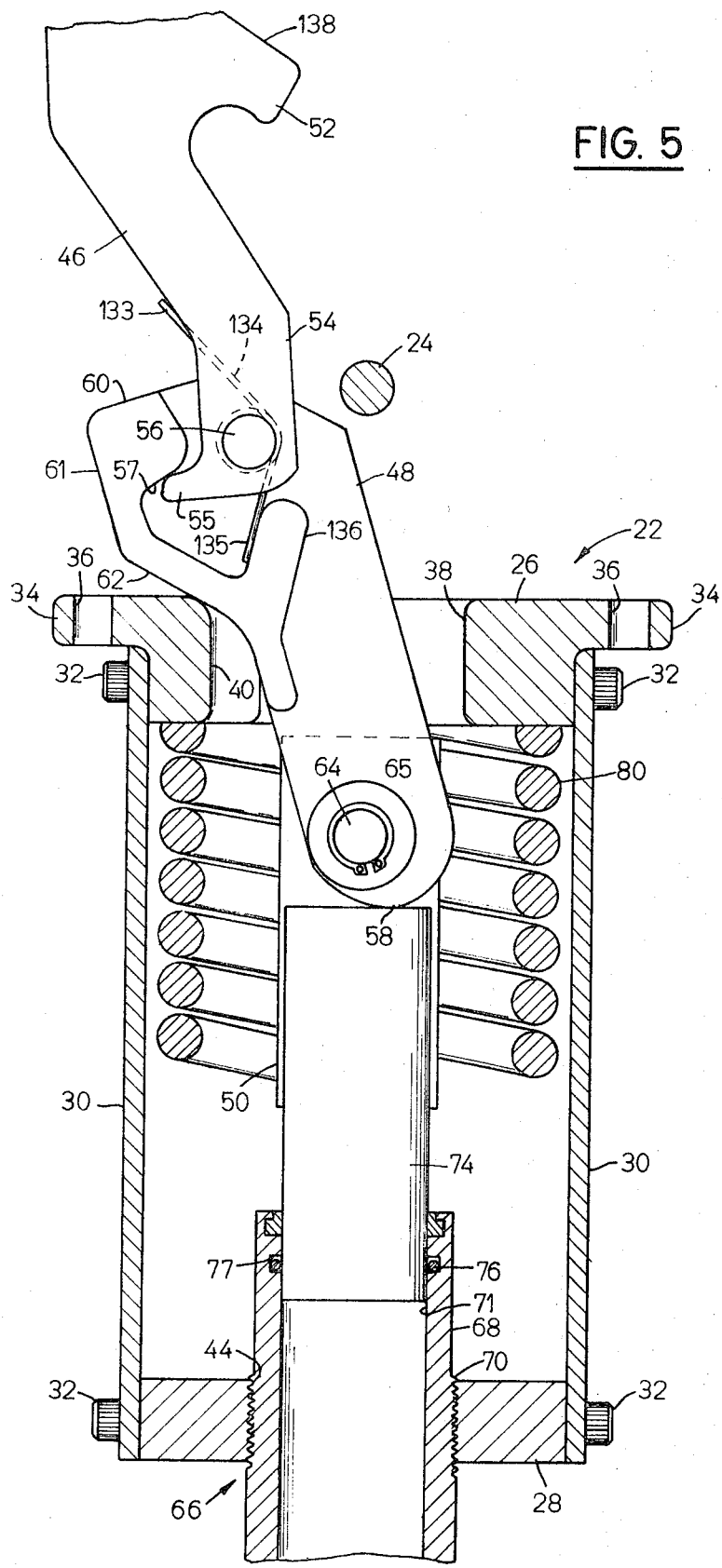

TILT CAB LATCH DEVICE

BACKGROUND OF THE INVENTION

In tilt cab vehicles, the cab is mounted for pivotal movement on the vehicle chassis and is generally pivoted to an elevated position by a hydraulic piston and cylinder assembly as shown in U.S. Pat. No. 2,939,541 entitled "Mounting and Lock Means for a Forwardly Tilting Motor Vehicle Cab" issued June 7, 1960. The cab, on return to the normal or load position, must be positively locked to the vehicle chassis for road travel. On most vehicles a mechanically actuated linkage has been used to lock and release the tilt cab from the chassis. These linkages are generally mechanically actuated and are easily damaged due to misalignment or premature closing. It has also been found that if the cab is rigidly locked to the chassis, shock loads imparted to the chassis are transferred directly to the cab.

SUMMARY OF THE INVENTION

The hydraulic locking device of the present invention provides for the resilient engagement of the tilt cab to the vehicle chassis as well as automatic displacement in the event of premature closing of the locking device. The locking device is hydraulically connected to the hydraulic lift circuit for the cab to provide for automatic release prior to lifting of the cab and automatic locking after release of pressure in the cab lift circuit. Positive engagement of the locking device is accomplished by providing a camming action between the cab latch pin and the hook for the locking device which allows the hook to be cammed out of alignment with the latch pin when the cab is closed. The latch assembly has been simplified by using an eccentric or offset relation between the hydraulic ram and the camming plate for the latch assembly which provides both linear and angular forces to initially produce disengagement of the hook from the latch pin and subsequent pivotal movement out of the path of travel of the latch pin. This eccentric or offset relation between the hydraulic ram and the camming plate also provides the means which enables the latch hook to be pulled straight up by the cab without unhooking from the cab latch pin. When the camming plate is pulled away from the hydraulic ram, all rotary forces are removed from the latch. A fluid cushion or dashpot action can be provided in the hydraulic ram to absorb the shock of the return movement of the cab under shock loading. An automatically actuated electrical signal system can be provided on the locking device to indicate when the latch assembly is in the locked position.

DRAWINGS

FIG. 5 is a view similar to FIG. 3 showing the latch assembly in the open position;

DESCRIPTION OF THE INVENTION

Figure 1:
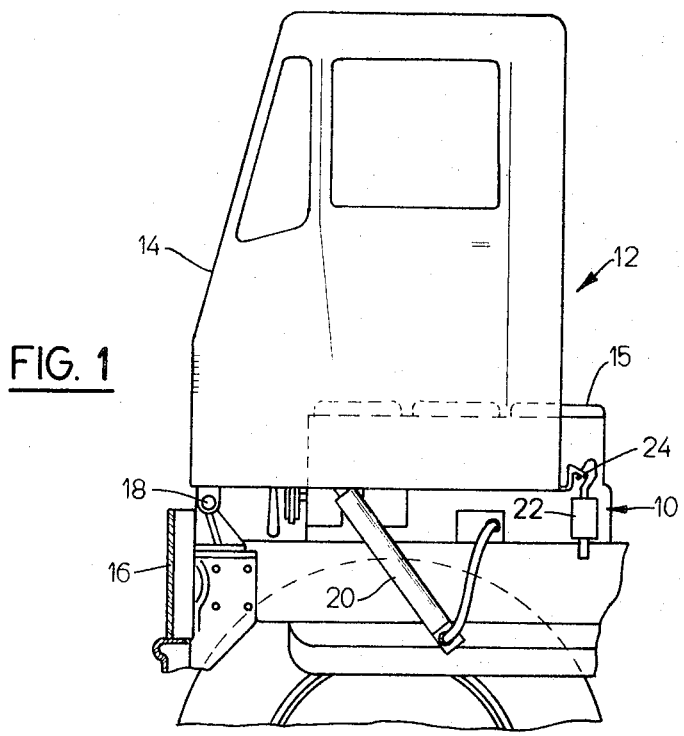
FIG. 1 is a side view of a tilt cab vehicle partially broken away to show the hydraulic locking devices.
Figure 2:
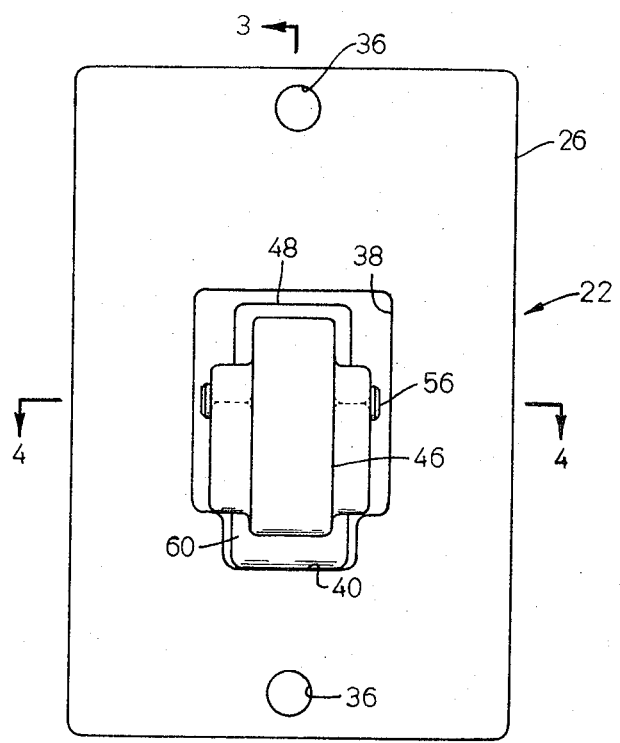
FIG. 2 is a top view of the latch assembly for the locking device.

The locking device 10 of the present invention is used in conjunction with a tilt-type cab vehicle 12 to releasably secure a cab 14 to the vehicle chassis 16. In a vehicle of this type as seen in FIG. 1, the cab 14 is mounted for pivotal movement about a pivot shaft or connection 18 to expose the engine 15. The cab 14 is tilted to gain access to the engine 15 by means of a hydraulic piston and cylinder assembly 20.

The locking device 10 includes a latch assembly 22 shown mounted on the chassis 16 in a position to engage a latch pin 24 provided on the cab 14. As seen in FIG. 1, the locking device 10 is shown on one side of the cab 14, however, it is within the contemplation of this invention to use a locking device 10 on each side of the cab 14 in order to positively lock the cab 14 to the chassis 16 in larger vehicles. In some cases, the locking device 10 may be mounted on the cab while the pin 24 is secured to the chassis 16.

THE LATCH ASSEMBLY

The latch assembly 22 (FIGS. 2 through 5A) generally includes a mounting plate 26 and a support plate 28 interconnected by means of a pair of side plates 30. In this regard, a number of bolts 32 are used to secure the side plates 30 to the mounting plate 26 and support plate 28.

The mounting plate 26 includes flanges 34 extending outwardly from each side and a number of openings 36 provided in each of the flanges. A central opening 38 is provided in the mounting plate and a cam groove 40 is located on one side of the opening 38. The mounting plate 26 is secured to the chassis 16 by means of a number of bolts (not shown) which extend through the openings 36. The support plate 28 includes a threaded opening 44 which is generally aligned with the opening 38.

Means are provided in the latch assembly 22 for releasably engaging the latch pin 24. Such means is in the form of a hook member 46 mounted on a camming plate or link 48 which is supported on the support plate 28 by means of a pair of L-shaped spring brackets 50. The hook member 46 includes a hook portion 52 at one end and a bifurcated mounting flange 54 at the other end. The hook member 46 is pivotally connected to the camming plate 48 by means of a pivot pin 56. A limit stop 55 is provided on the flange 54.

Figure 3:
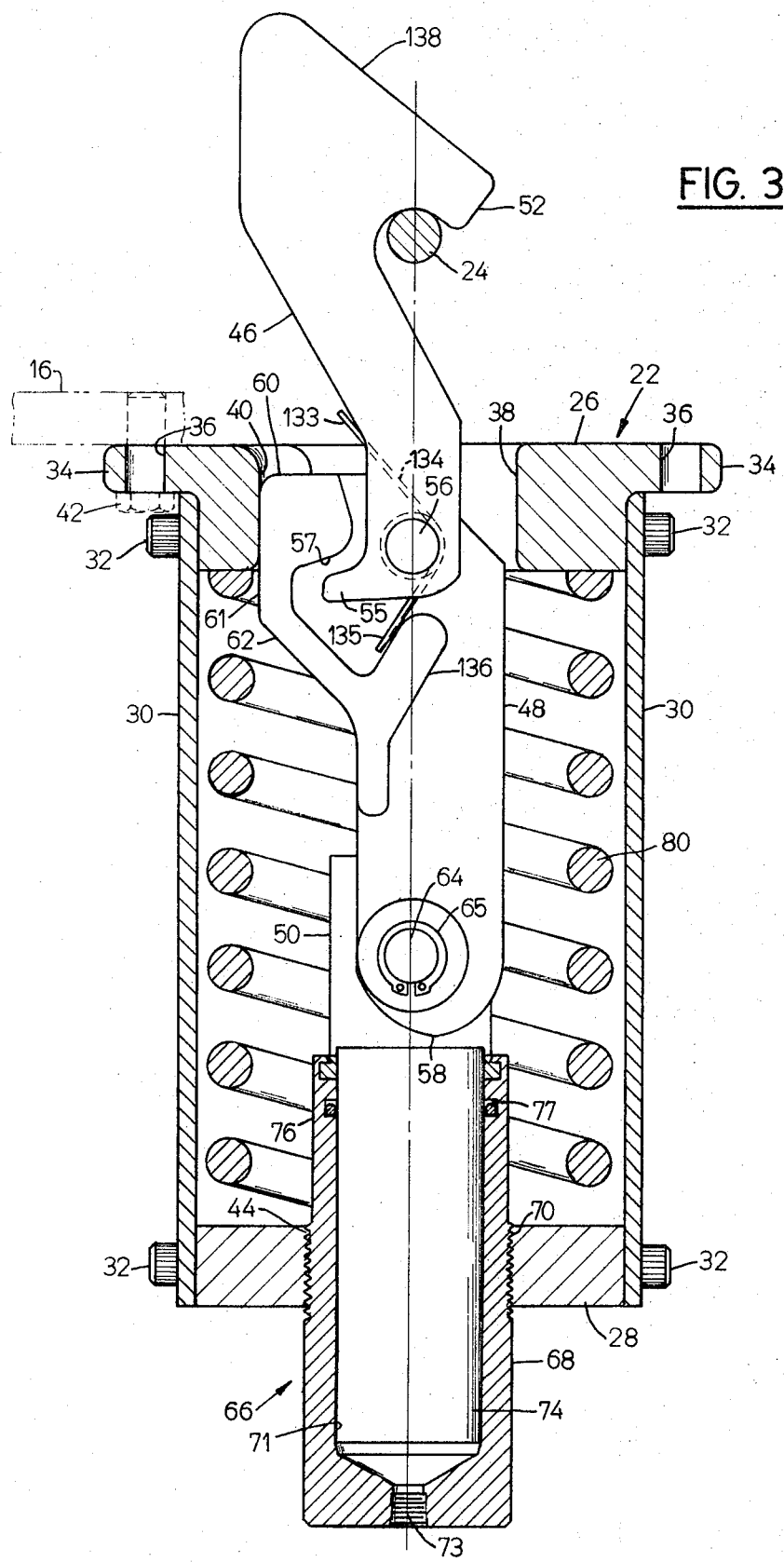
FIG. 3 is a view taken on line 3—3 of FIG. 2 showing the latch assembly in the closed position.

The camming plate 48 includes an abutment or contact point 58 at one end and a guide surface 60 at the other end. The guide surface 60 is positioned to slide through the cam groove 40 in the opening 38 in the mounting plate 26. The guide surface 60 is provided with a first or linear cam surface 61 and a second or inclined cam surface 62. The cam surfaces 61 and 62 cooperate with the cam groove 40 to provide for initial linear or axial movement of the camming plate 48 as it moves linearly through the opening 38 and pivotal movement after the hook 46 clears the pin 24. The camming plate 48 is pivotally connected to the spring brackets 50 by means of a pivot pin 64 which extends through a bore 65 in a boss 67 in the camming plate 48. It should be noted that the abutment 58 at the end of the camming plate 48 as seen in FIG. 3 is offset from the axis of the pivot pin 64. A fixed stop 57 is provided on each side of the camming plate in a position to engage the limit stop 55 on the hook member 46.

HYDRAULIC RAM ASSEMBLY

Means are provided for moving the camming plate 48 axially through the openings 38 in the mounting plate. Such means is in the form of a hydraulic ram assembly 66. The ram assembly 66 includes a housing 68 having an outer threaded section 70, a cylindrical bore 71 and an inlet passage 73. The housing 68 is mounted in the threaded opening 44 in the support plate 28 and is locked therein by means of a set screw 72. A ram 74 is mounted for axial movement within the cylindrical bore 71 and is sealed therein by means of an O-ring seal 76 provided in a groove 77 in the housing 68. Hydraulic fluid is admitted to the housing 68 through the inlet opening 73 to move the ram into engagement with the abutment 58 on the camming plate 48.

It should be noted that the point of engagement of the ram 74 with the contact point 58 on camming plate 48 is offset from the pivot axis of the pivot pin 64. The force of the ram 74 acting on the camming plate 48 will produce a rotary force on the camming plate 48 around the pin 64. The cam surface 61 will be forced against the cam groove 40 allowing the hook 46 to move axially or linearly to release the hook portion 52 of the hook member 46 from the pin 24. When the cam surface 61 clears the groove 40, the cam surface 62 will allow the hook member 46 to move angularly out of the path of travel of the pin 24.

Means are provided for biasing the hook member 46 to the locking position with respect to the latch pin 24. Such means is in the form of a compression spring 80 provided between the mounting plate 26 and the brackets 50. The spring 80 will force the brackets 50 against the support plate 28 when the pressure of the fluid in bore 71 of the ram assembly 68 is released. Return movement of the brackets 50 will pull the camming plate 48 and hook member into locking engagement with the pin 24.

In operation, whenever a shock load is imparted to the cab the cam plate 48 and hook 54 will be pulled upward against the bias of spring 80.

Figure 5A:
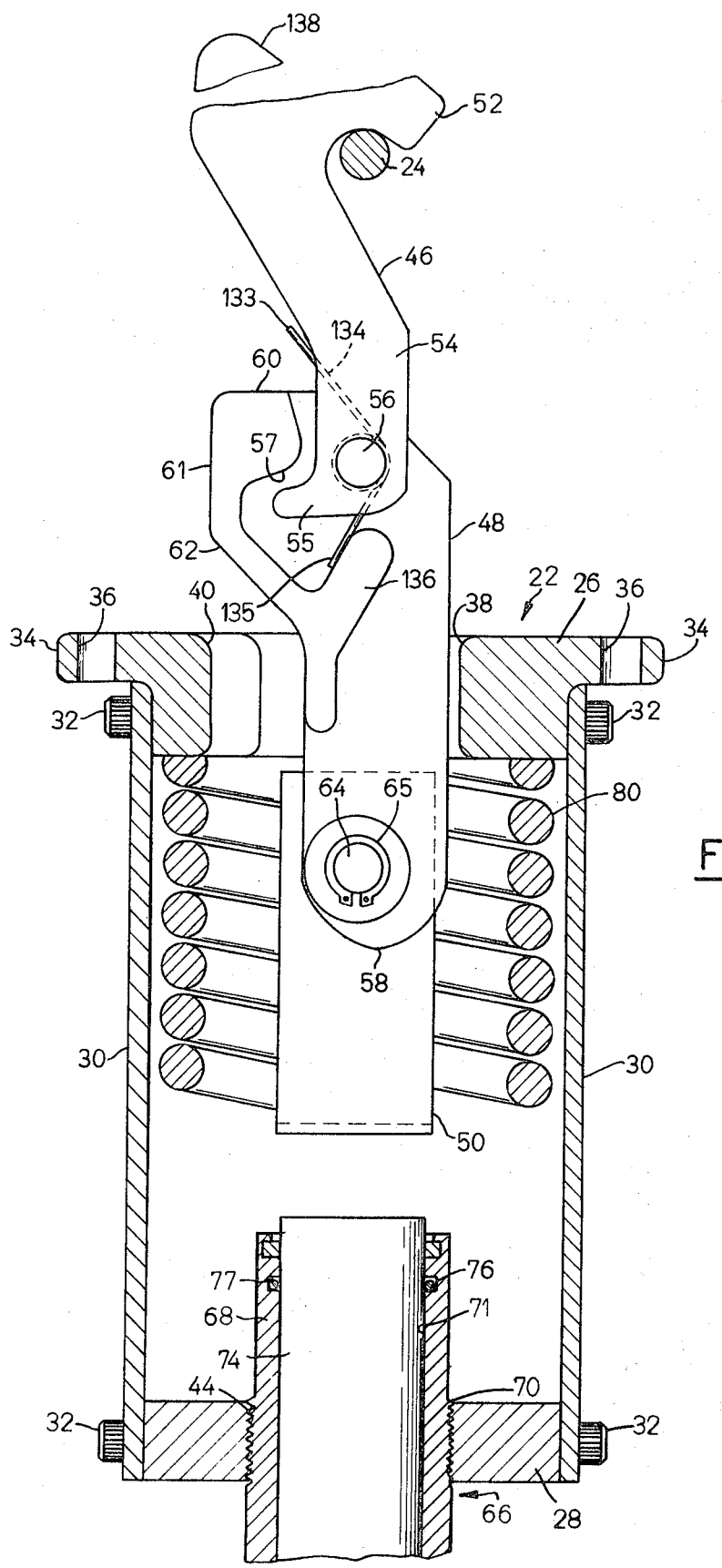
FIG. 5A is a view similar to FIG. 5 but showing the disposition of components in the latch assembly when the latch is subjected to shock forces causing upward movement of the cab latch pin.

Referring to FIG. 5A, the hook 54 and cam plate 48 are shown in a shock load position. The cam plate 48 is spaced or disengaged from the ram 74 and all rotary forces are removed from the latch. The hook 54 is then free to move with the latch pin 24 and will remain in the latched position.

HYDRAULIC CIRCUIT

Figure 7:
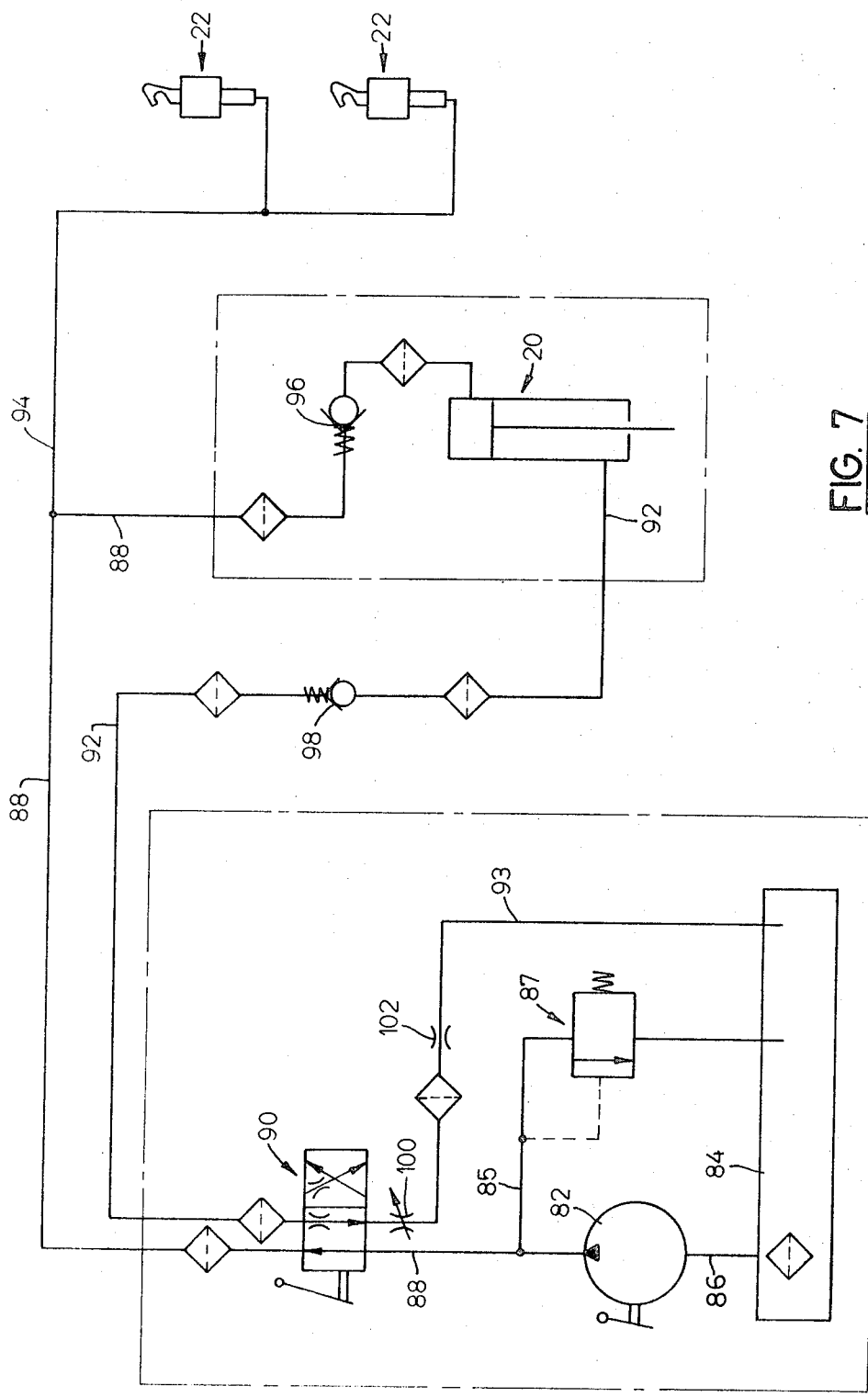
FIG. 7 is a schematic showing of the hydraulic circuit for the locking device of the present invention.

The latch assemblies 22 are connected to the hydraulic circuit for the tilt cab lift cylinder 20 to provide for the release of the latch assemblies 22 from the latch pin 24 prior to movement of the cab 14 and to return the latch assemblies 22 to the locking position after the cab 14 has been returned to its initial position on the chassis 16. Referring to FIG. 7, the hydraulic circuit includes a pump 82 connected to a reservoir 84 by means of line 86. The pump 82 is connected by hydraulic line 88 through a two-position control valve 90 to the lift cylinder 20. Fluid from the lift cylinder 20 is returned to the reservoir 84 through lines 92 and 93. The latch assemblies 22 are connected to the line 88 by hydraulic lines 94. Velocity fuses 96 and 98 are provided in the fluid lines 88 and 92, respectively, to prevent loss of fluid pressure in the cylinder 20 if one of the lines 88 or 92 breaks.

The pressure in line 88 is controlled by means of a bypass circuit 85 connected to reservoir 84. The bypass circuit includes a pressure responsive relief valve 87 which is set to relieve pressure in the line 88 when the pressure in line 88 exceeds the pressure required to move the cab 14.

When the pump 82 is actuated to lift the cab 14, fluid pressure will build up in the line 88. The force required to lift the cab 14 should be greater than the force required to overcome the bias of the spring 80. The latch assemblies 22 will therefore open and disengage from the pin 24 prior to any movement of the cab 14. Pressure in line 88 will continue to build up in the cylinder 20 until the cab 14 lifts from the chassis 16. To return the cab to its initial position, the valve 90 is moved to the left to connect the fluid line 88 to the reservoir 84. The flow of fluid to the reservoir 84 can be retarded to cushion the return motion of the cab 14 by providing means such as restricted orifices 100 and 102 in the line 93.

MODIFIED LATCH ASSEMBLY (FIG. 6)

Figure 6:
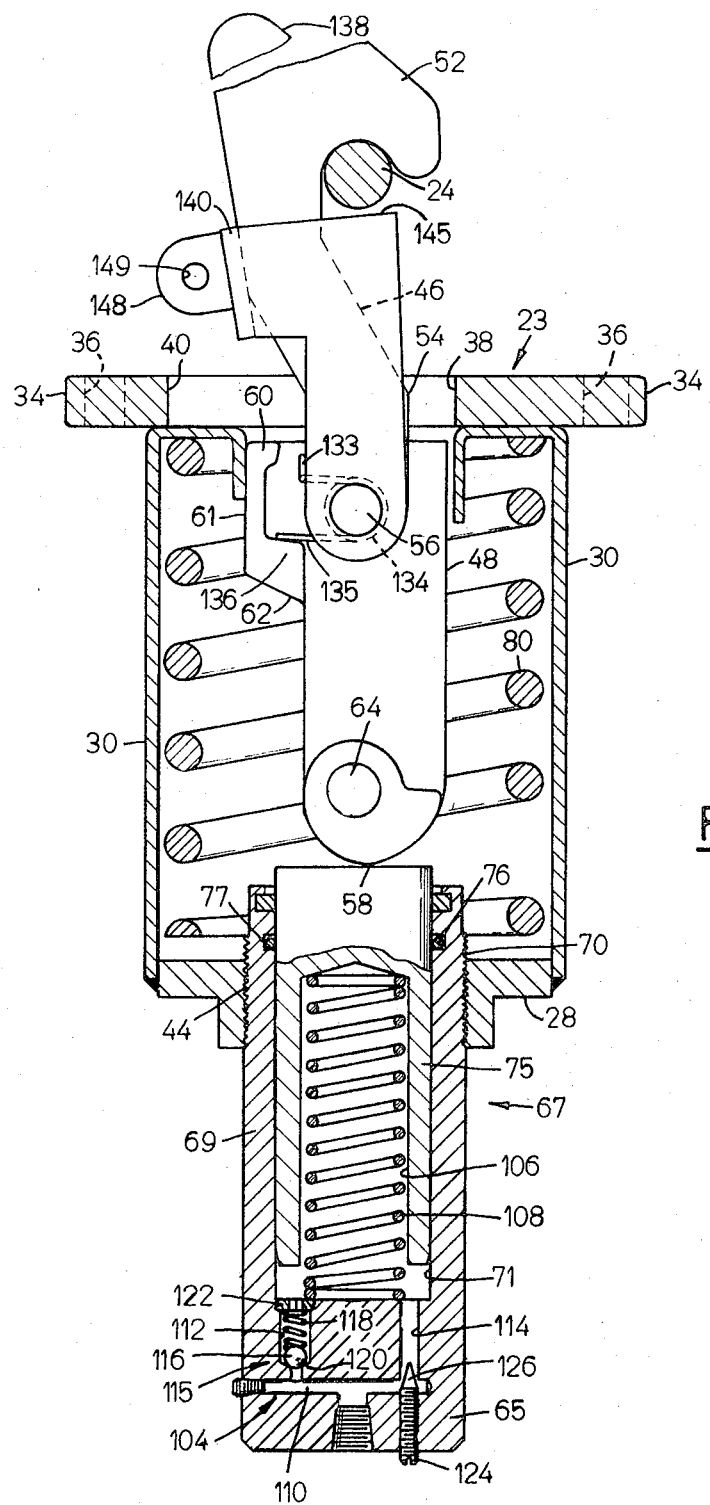
FIG. 6 is a view similar to FIG. 3 showing a modified arrangement for the hydraulic ram assembly.

Referring to FIG. 6, a modified latch assembly 23 is shown which provides a fluid cushion action to absorb the shock of the return movement of the cab 14 when subjected to a shock load. This is accomplished by providing a modified hydraulic ram assembly 67 which includes a hydraulic circuit 104 in the base 65 of the housing 69. In this regard, the hydraulic circuit 104 is connected to the inlet port 73 by blind bore 110 which in turn is connected to the bore 71 of the housing 69 by an inlet passage 112 and a metering passage 114. The inlet passage 112 is provided with means for preventing return flow to the passage 110. Such means is in the form of a one-way check valve 115 which includes a ball 116 biased by a spring 118 into engagement with a valve seat 120 provided in passage 112. The spring 118 is retained within the passage 112 by means of an apertured retainer nut 122. The flow of fluid through the metering passage 114 is controlled by means of a metering screw 124 having a needle control point 126 positioned in the passage 114. The metering screw 124 can be selectively positioned to control the return flow rate through passage 114.

As seen in FIG. 6, the ram 75 is biased to follow the movement of the camming plate 48. The ram 75 is provided with a blind bore 106 and is biased into engagement with the contact point 58 of the camming plate 48 by means of a compression spring 108.

In operation, whenever a shock load is imparted to the cab the camming plate 48 and hook 54 will be pulled straight upward against the bias of spring 80. The ram 75 will follow the movement of the camming plate 48 due to the bais of the spring 108. The upward movement of the ram 75 will draw fluid into the bore 71 past the check valve 116 and the metering screw 124. On return movement of the cab, the flow of fluid through the inlet passage 112 will be prevented by the check valve 116. The flow of fluid through the metering passage 114 will be retarded by the point 126 of the metering screw 124. The fluid in the housing 71 will act as a dashpot to cushion or damp the return movement of the cab 14.

With regard to the embodiments shown in FIGS. 5 and 6, the eccentric or offset relation between the hydraulic rams 74 and 75 and the camming plate 48 also provides the means which enables the latch hook 46 to be pulled straight up by the cab in response to shock forces without unhooking from the cab latch pin 24. When the camming plate 48 is pulled away from the hydraulic ram, all rotary forces are removed from the latch. This motion is illustrated for latch assembly 22 in FIG. 5A.

Figure 9:
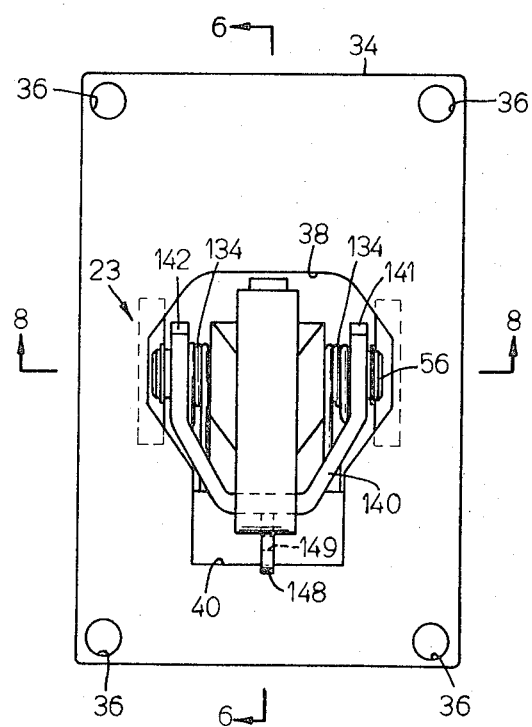
FIG. 9 is a top plan view of the latch assembly shown in FIG. 6.
Figure 8:
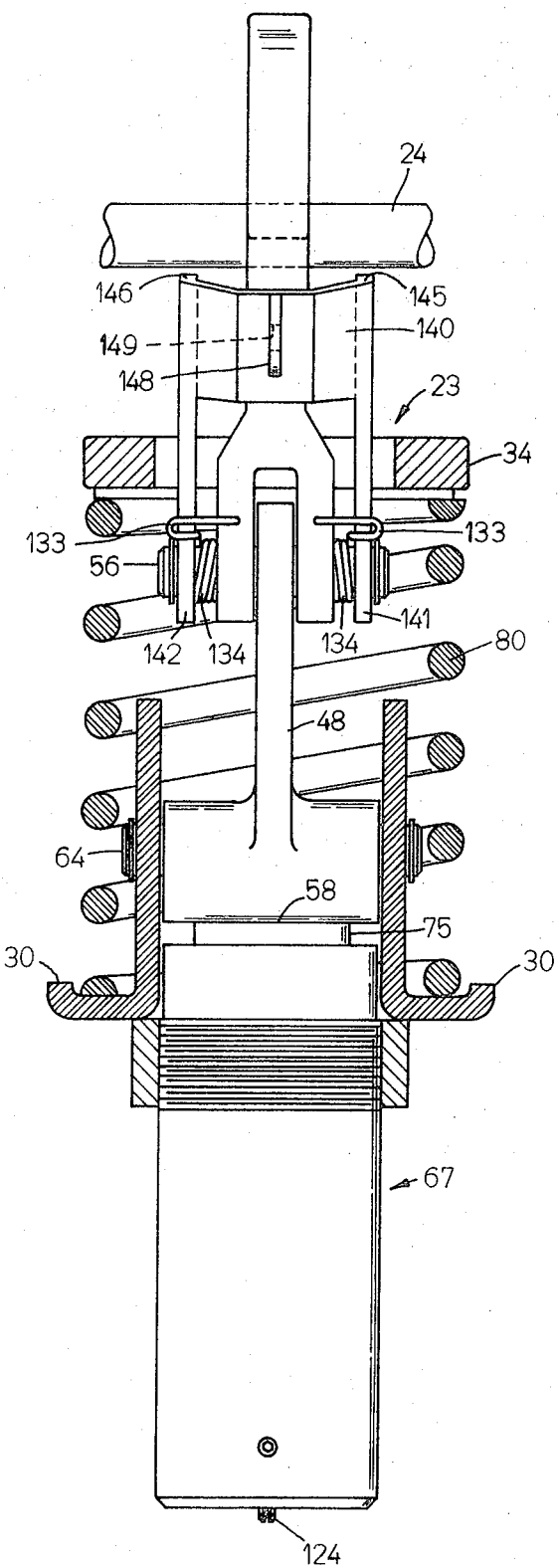
FIG. 8 is a view, partly in section, taken on line 8—8 of FIG. 9.

In the embodiment shown in FIGS. 6, 8 and 9, means are provided to enable the cam plate 48 to be moved straight downward against ram 75 by cab latch pin 24 in response to downward return movement of the cab after the cab has moved upwardly in response to shock forces. Such means comprise a U-shaped bracket 140 which has a pair of legs 141 and 142 which are pivotably connected to pivot pin 56. Bracket 140 is normally biased clockwise (with respect to FIG. 6) by spring 134 so that the top edges 145 and 146 thereof are disposed directly beneath cab latch pin 24. As cab latch pin 24 moves downwardly, it acts against the edges 145 and 146 of bracket 140, moving the latter downwardly and also forcing cam plate 48 downwardly against ram 75. The oil pressure in ram 75 resists the downward force exerted on the ram 75 and acts with a dashpot effect to effect a slow, smooth return movement of pin 24, cam plate 48 and ram 75. As pin 24 moves downwardly it is prevented from disengagement from hook member 46. More specifically, pin 24 is unable to slide downwardly on the sloped edge of hook 46 and is also unable to slip out from between the smaller opening between the top edges 145 and 146 of bracket 140 and hook portion 52.

Bracket 140 also provides a secondary mode of latching that must be released to disengage cab latch pin 24 from hook member 46 before the cab can be tilted upward. Accordingly, bracket 140 is provided with a flange 148 having a hole 149 therein by which it is adapted to be secured to a suitable type of secondary latch release (not shown). Counterclockwise pivotal movement (with respect to FIG. 6) of bracket 140 against the bias of spring 134 effected by operation of such a secondary latch release moves the bracket edges 145 and 146 clear of cab latch pin 24 so that hook member 46 can subsequently be disengaged from cab latch pin 24 by operation of the latch assembly 23 as hereinbefore described. Thus, bracket 140 provides an additional safety feature to prevent accidental detachment of hook member 46 from pin 24.

ACTUATED SIGNAL DEVICE

Figure 4:
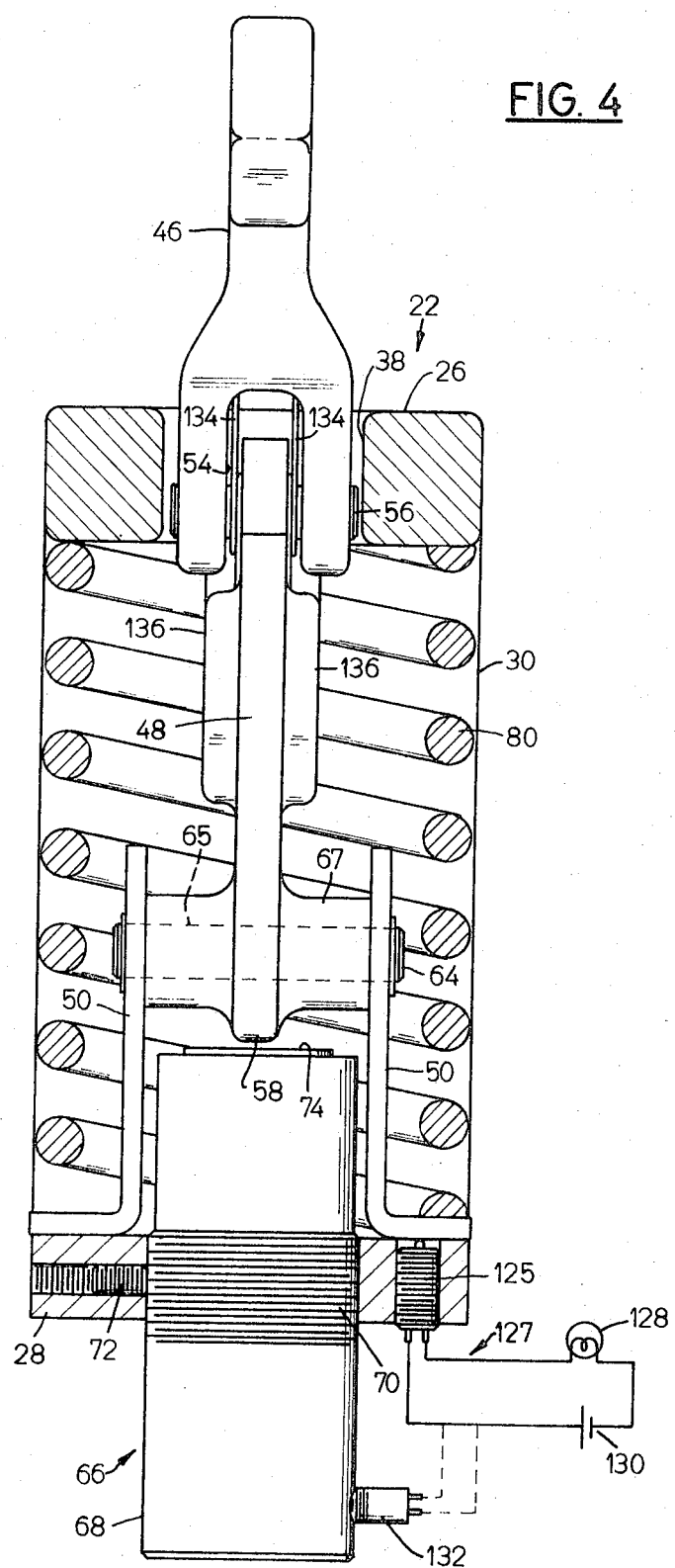
FIG. 4 is a view taken on line 4—4 of FIG. 2 showing the latch assembly in the closed position.
Figure 4A:
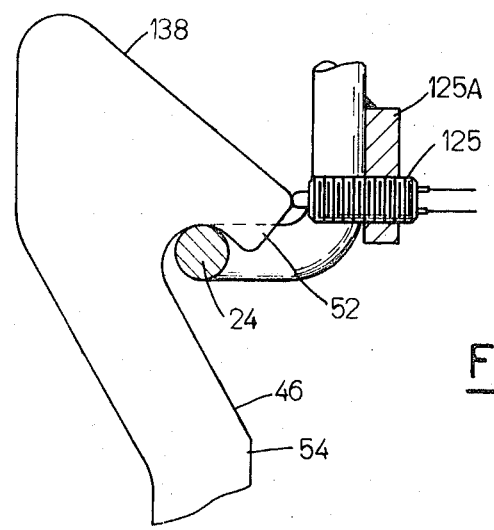
FIG. 4A is a view of a portion of the latch assembly shown in FIG. 4 and depicts an alternative location of the electric switch shown in FIG. 4.

Means can be provided on the latch assembly 22 to indicate when the latch assembly is in the open or closed position. Such means, as seen in FIG. 4, includes a normally open switch 125 provided in the support plate 28 in a position to engage bracket 50 and an electrical circuit 127. A lamp or light 128 and a source of electricity such as a battery 130 are provided in the circuit 127. Whenever the spring bracket 50 is moved away from the support plate 28, the normally open switch 125 will close, completing the circuit to the light 128. When the latch assembly 22 is returned to the locked or latched position, the spring bracket 50 will reopen the switch 125 opening the circuit of the lamp 128. If desired, the switch 125 can be in the form of a pressure switch 132 mounted in the sidewall of the housing 68 (shown dotted in FIG. 4) which responds to an increase of pressure in the bore 71 of housing 68 to indicate that the lift hydraulic circuit is under pressure. Or, as FIG. 4A shows, switch 125 can be mounted by means of a support bracket 125A on latch pin 24 so as to be operated by hook member 46.

Means are provided to allow the hook 46 to move out of the path of travel of the latch pin 24 in the event the latch assembly 22 closes before the cab 14 returns to the road position on the chassis 16. Such means is in the form of a pair of springs 134 provided on the pivot pin 56. The upper end 133 of the spring 134 is positioned to engage the hook 46 and the lower end 135 is positioned to engage a stop member 136 provided on each side of the camming plate 48. Whenever the cab 14 returns to its road position with the latch assembly closed, the latch pin 24 will engage the inclined cam surface 138 on the hook member 46 causing the hook member 46 to pivot about the pin 56 against the bias of spring 134. When the pin 24 clears the hook portion 52 of the hook member, the spring 134 will bais the hook member back to its initial locking position with respect to the pin 124.

We claim:

1. In a tilt-cab vehicle having a cab pivotally mounted on a vehicle chassis and movable between an over-the-road position and a tilted position, a lift assembly for tilting said cab, locking means for releasably latching said cab to said chassis comprising: a latch pin mounted on one of said cab and chassis and a latch assembly mounted on the other of said cab and chassis and comprising: a member movable along a longitudinal path in directions toward and away from said latch pin; means for biasing said member in a direction away from said latch pin; a camming plate pivotally connected to said member at a pivot point and having a hook for releasable engagement with said pin; said camming plate being provided with linear and angular cam surfaces and being further provided with a force application point laterally offset from the longitudinal path of travel of said pivot point; a cam guide for guiding engagement with said cam surfaces; and ram means movable along a longitudinal path in a direction toward said latch pin to apply force to said force application point to impart a rotary bias to said camming plate about said pivot point to effect guiding engagement between said cam surfaces and said cam guide and to initially move said hook linearly out of engagement with said latch pin and to subsequently move said hook laterally out of the path of movement of said latch pin.

2. A vehicle according to claim 1 wherein said hook is pivotally connected to said camming plate and is provided with a cam surface engageable by said latch pin and further comprising second biasing means for biasing said hook into a latching position, said hook being movable by said latch pin out of the path of travel of said latch pin as said cab is returned to over-the-road position to enable said latch pin to make latching engagement with said hook.

3. In a tilt-cab vehicle having a cab pivotally mounted on a vehicle chassis and movable between an over-the-road position and a tilted position, a lift assembly for tilting said cab, and locking means for releasably latching said cab to said chassis and serving to absorb shock, said locking means comprising a latch pin on one of said cab and chassis and a latch assembly mounted on the other of said cab and chassis, said latch assembly comprising: a first member movable along a longitudinal path in directions toward and away from said latch pin; a camming plate pivotally connected to said first member at a pivot point and provided with linear and angular cam surfaces and being further provided with a force application point laterally offset from the longitudinal path of travel of said pivot point; a hook on said camming plate for releasable engagement with said latch pin; first biasing means for biasing said first member and said camming plate in a direction away from said latch pin to maintain said hook in latch pin engaging position, said first biasing means serving to absorb shock as said cab and chassis move apart while said latch pin and hook are engaged; a cam guide for guiding engagement with said cam surfaces; ram means including a second member movable in opposite directions along said longitudinal path and selectively movable in the direction toward said latch pin to apply force to said force application point to impart a rotary bias to said camming plate about said pivot point to effect guiding engagement between said cam surfaces and said cam guide and to initially move said hook linearly out of engagement with said latch pin and to subsequently move said hook laterally out of the path of movement of said latch pin; second biasing means for effecting following engagement of said second member of said ram means with said camming plate as said cab and chassis move apart while said latch pin and hook are engaged; and means to retard return movement of said second member and absorb shock as said cab and chassis move together while said latch pin and hook are engaged.

4. A vehicle according to claim 3 wherein said hook is pivotally connected to said camming plate and is provided with a cam surface engageable by said latch pin, and comprising biasing means for biasing said hook into latching position, said hook being movable by said latch pin out of the path of travel of said latch pin as said cab is return to over-the-road position to enable said latch pin to make latching engagement with said hook.

5. A vehicle according to claim 4 including movable means on said hook for engagement with said latch pin to enable said latch pin to effect return movement of said hook, said camming plate and said first member as said cab and chassis move together while said latch pin and hook are engaged.

6. In a tilt-cab vehicle having a cab pivotally mounted on a vehicle chassis and movable between an over-the-road position and a tilted position, a lift assembly for tilting said cab, locking means for releasably latching said cab to said chassis comprising: a latch pin mounted on said cab and a latch assembly mounted on said chassis and comprising: a support attached to said chassis; a member movable on said support along a longitudinal path in directions toward and away from said latch pin; means on said support for biasing said member in a direction away from said latch pin; a camming plate pivotally connected to said member at a pivot point and having a hook for releasable engagement with said pin; said camming plate being provided with linear and angular cam surfaces and being further provided with a force application point laterally offset from the longitudinal path of travel of said pivot point; a cam guide on said support for guiding engagement with said cam surfaces; and hydraulically operable ram means on said support, said ram means comprising a ram member movable along a longitudinal path in a direction toward said latch pin to apply force to said force application point to impart a rotary bias to said camming plate about said pivot point to effect guiding engagement between said cam surfaces and said cam guide and to initially move said hook linearly out of engagement with said latch pin and to subsequently move said hook laterally out of the path of movement of said latch pin.

7. A vehicle according to claim 6 wherein said hook is pivotally connected to said camming plate and is provided with a cam surface engageable by said latch pin and further comprising second biasing means between said camming plate and said hook for biasing said hook into a latching position, said hook being movable by said latch pin out of the path of travel of said latch pin as said cab is returned to over-the-road position to enable said latch pin to make latching engagement with said hook.

8. In a tilt-cab vehicle having a cab pivotally mounted on a vehicle chassis and movable between an over-the-road position and a titlted position, a lift assembly for tilting said cab, and locking means for releasably latching said cab to said chassis in over-the-road position and serving to absorb shock, said locking means comprising a latch pin on one of said cab and chassis and a latch assembly mounted on the other of said cab and chassis, said latch assembly comprising: a first member movable along a longitudinal path in directions toward and away from said latch pin; a camming plate pivotally connected to said first member at a pivot point and provided with linear and angular cam surfaces and being further provided with a force application point laterally offset from the longitudinal path of travel of said pivot point; a hook on said camming plate for releasable engagement with said latch pin; first biasing means for biasing said first member and said camming plate in a direction away from said latch pin to maintain said hook in latch pin engaging position, said first biasing means serving to absorb shock as said cab and chassis move apart while said latch pin and hook are engaged; a cam guide for guiding engagement with said cam surfaces; hydraulically operable ram means including a cylinder and a piston movable in opposite directions along said longitudinal path and selectively movable by supplying fluid to said cylinder in the direction toward said latch pin to apply force to said force application point to impart a rotary bias to said camming plate about said pivot point to effect guiding engagement between said cam surfaces and said cam guide and to initially move said hook linearly out of engagement with said latch pin and to subsequently move said hook laterally out of the path of movement of said latch pin; second biasing means for effecting following engagement of said piston with said camming plate as said cab and chassis move apart while said latch pin and hook are engaged to cause hydraulic fluid to enter said cylinder; and means including a check valve and a metering valve connected to said cylinder to retard fluid flow from said cylinder to retard return movement of said piston and absorb shock as said cab and chassis move together while said latch pin and hook are engaged.

9. A vehicle according to claim 8 wherein said hook is pivotally connected to said camming plate and is provided with a cam surface engageable by said latch pin, and comprising biasing means between said camming plate and said hook for biasing said hook into latching position, said hook being movable by said latch pin out of the path of travel of said latch pin as said cab is returned to over-the-road position to enable said latch pin to make latching engagement with said hook.

10. A vehicle according to claim 9 including a movable member pivotally mounted on said hook for engagement with said latch pin as the latter moves toward said latch assembly to enable said latch pin to effect return movement of said hook, said camming plate and said first member as said cab and chassis move together while said latch pin and hook are engaged.

11. A latch assembly for releasably latching two relatively movable elements, one of which is provided with a latching pin, while enabling limited relative movement between said elements comprising: a member movable along a longitudinal path in directions toward and away from said latch pin; means for biasing said member in a direction away from said latch pin; a camming plate pivotally connected to said member at a pivot point and having a hook for releasable engagement with said pin; said camming plate being provided with linear and angular cam surfaces and being further provided with a force application point laterally offset from the longitudinal path of travel of said pivot point; a cam guide for guiding engagement with said cam surfaces; and ram means movable along a longitudinal path in a direction toward said latch pin to apply force to said force application point to impart a rotary bias to said camming plate about said pivot point to effect guiding engagement between said cam surfaces and said cam guide and to initially move said hook linearly out of engagement with said latch pin and to subsequently move said hook laterally out of the path of movement of said latch pin.

12. A latch assembly according to claim 11 wherein said hook is pivotally connected to said camming plate and is provided with a cam surface engageable by said latch pin and further comprising second biasing means for biasing said hook into a latching position, said hook being movable by said latch pin out of the path of travel of said latch pin as said elements come together to enable said latch pin to make latching engagement with said hook.

13. A latch assembly for releasably latching two relatively movable elements, one of which is provided with a latch pin and serving to absorb shock, said latch assembly comprising: a first member movable along a longitudinal path in directions toward and away from said latch pin; a camming plate pivotally connected to said first member at a pivot point and provided with linear and angular cam surfaces and being further provided with a force application point laterally offset from the longitudinal path of travel of said pivot point; a hook on said camming plate for releasable engagement with said latch pin; first biasing means for biasing said first member and said camming plate in a direction away from said latch pin to maintain said hook in latch pin engaging position, said first biasing means serving to absorb shock as said elements move apart while said latch pin and hook are engaged; a cam guide for guiding engagement with said cam surfaces; ram means including a second member movable in opposite directions along said longitudinal path and selectively movable in the direction toward said latch pin to apply force to said force application point to impart a rotary bias to said camming plate about said pivot point to effect guiding engagement between said cam surfaces and said cam guide and to initially move said hook linearly out of engagement with said latch pin and to subsequently move said hook laterally out of the path of movement of said latch pin; second biasing means for effecting following engagement of said second member of said ram means with said camming plate as said elements move apart while said latch pin and hook are engaged; and means to retard return movement of said second member and absorb shock as said elements move together while said latch pin and hook are engaged.

14. A latch assembly according to claim 13 wherein said hook is pivotally connected to said camming plate and is provided with a cam surface engageable by said latch pin, and comprising biasing means for biasing said hook into latching position, said hook being movable by said latch pin out of the path of travel of said latch pin as said elements come together to enable said latch pin to make latching engagement with said hook.

15. A latch assembly according to claim 14 including movable means on said hook for engagement with said latch pin to enable said latch pin to effect return movement of said hook, said camming plate and said first member as said elements move together while said latch pin and hook are engaged.

16. A latch assembly for releasably latching two relatively movable elements, one of which is provided with a latching pin and serving to absorb shock, said latch assembly comprising: a first member movable along a longitudinal path in directions toward and away from said latch pin; a camming plate pivotally connected to said first member at a pivot point and provided with linear and angular cam surfaces and being further provided with a force application point laterally offset from the longitudinal path of travel of said pivot point; a hook on said camming plate for releasable engagement with said latch pin; first biasing means for biasing said first member and said camming plate in a direction away from said latch pin to maintain said hook in latch pin engaging position, said first biasing means serving to absorb shock as said elements move apart while said latch pin and hook are engaged; a cam guide for guiding engagement with said cam surfaces; hydraulically operable ram means including a cylinder and piston movable in opposite directions along said longitudinal path and selectively movable by supplying fluid to said cylinder in the direction toward said latch pin to apply force to said force application point to impart a rotary bias to said camming plate about said pivot point to effect guiding engagement between said cam surfaces and said cam guide and to initially move said hook linearly out of engagement with said latch pin and to subsequently move said hook laterally out of the path of movement of said latch pin; second biasing means for effecting following engagement of said piston with said camming plate as said elements move apart while said latch pin and hook are engaged to cause hydraulic fluid to enter said cylinder; and means including a check valve and a metering valve connected to said cylinder to retard fluid flow from said cylinder to retard return movement of said piston and absorb shock as said elements move together while said latch pin and hook are engaged.

17. A latch assembly according to claim 16 wherein said hook is pivotally connected to said camming plate and is provided with a cam surface engageable by said latch pin, and comprising biasing means between said camming plate and said hook for biasing said hook into latching position, said hook being movable by said latch pin out of the path of travel of said latch pin as said elements come together to enable said latch pin to make latching engagement with said hook.

18. A latch assembly according to claim 17 including a movable member pivotally mounted on said hook for engagement with said latch pin as the latter moves toward said latch assembly to enable said latch pin to effect return movement of said hook, said camming plate and said first member as said elements move together while said latch pin and hook are engaged.

* * * * *